United States Patent [19]

Ballivy

[11] Patent Number: 5,377,548
[45] Date of Patent: Jan. 3, 1995

[54] METHOD OF INSTRUMENTING AN ALREADY ERECTED CONCRETE STRUCTURE AND THE SO-INSTRUMENTED STRUCTURE

[75] Inventor: Gérard Ballivy, Sherbrooke, Canada

[73] Assignee: Universite de Sherbrooke, Sherbrooke, Canada

[21] Appl. No.: 965,844

[22] Filed: Oct. 23, 1992

[30] Foreign Application Priority Data

Apr. 23, 1990 [CA] Canada .................................. 2015184

[51] Int. Cl.$^6$ ............................................... G01N 3/00
[52] U.S. Cl. ....................................... 73/768; 73/786; 73/803
[58] Field of Search ................. 73/768, 774, 784, 786, 73/803

[56] References Cited

U.S. PATENT DOCUMENTS

| | | | |
|---|---|---|---|
| 1,708,333 | 4/1929 | Smith . | |
| 2,924,094 | 2/1960 | Hast | 63/786 |
| 3,286,513 | 11/1966 | Wasiutynski | 73/88.5 |
| 3,483,745 | 12/1969 | Ublacker | 73/784 |
| 3,503,254 | 3/1970 | Menard | 73/88 |
| 3,742,757 | 7/1973 | Callahan | 73/88.5 |
| 4,348,635 | 9/1982 | Wright et al. | 73/784 |
| 4,389,896 | 6/1983 | Babcock | 73/784 |
| 4,405,231 | 9/1983 | Shemyakin et al. | 73/768 |
| 4,526,044 | 7/1985 | Moser et al. | 73/862.06 |
| 4,530,245 | 7/1985 | Jacobson | 73/768 |
| 4,730,497 | 3/1988 | Rabensteiner et al. | 73/803 |
| 4,858,472 | 8/1989 | Herget et al. | 73/784 |

FOREIGN PATENT DOCUMENTS

| | | |
|---|---|---|
| 374587 | 5/1984 | Austria . |
| 0344926 | 12/1989 | European Pat. Off. . |
| 1510729 | 5/1978 | United Kingdom . |

OTHER PUBLICATIONS

Hornby, "Instrumentation techniques for strain measurements in concrete pressure vessels and similar structures", Central Elec. Research Laboratories, 1971.
Soviet Patent Abstracts, S-X Electrical, week 8849, Jan. 25, 1989 Derwent Publications Ltd., London, SO2, see SU 1401-260.

Primary Examiner—Robert Raevis
Attorney, Agent, or Firm—Fitzpatrick, Cella, Harper & Scinto

[57] ABSTRACT

The present invention relates to a method of instrumenting an already erected concrete or rock structure in order to determine the state of deformation of that structure. A cylindrical inclusion made of concrete having substantially the same mechanical properties as the concrete or the rock of the structure is inserted into a hole drilled into the concrete or rock. Sensors capable of detecting deformations are embedded in the concrete of the inclusion. The empty space between the inclusion and the hole is tightly filled with a grout whereby any deformation of the concrete or rock structure also deforms the inclusion and is therefore detected by the sensors embedded therein. The invention also extends to the inclusion and the so instrumented concrete or rock structure.

17 Claims, 2 Drawing Sheets

U.S. Patent     Jan. 3, 1995     Sheet 1 of 2     5,377,548
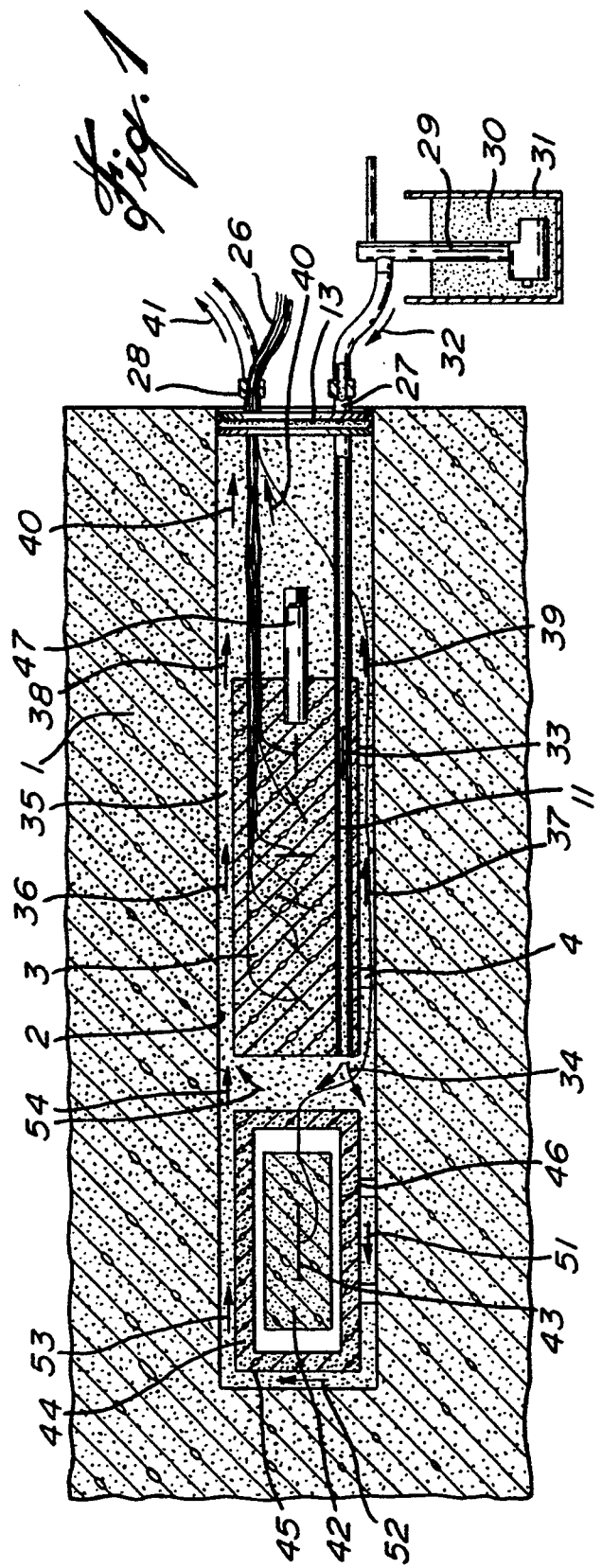
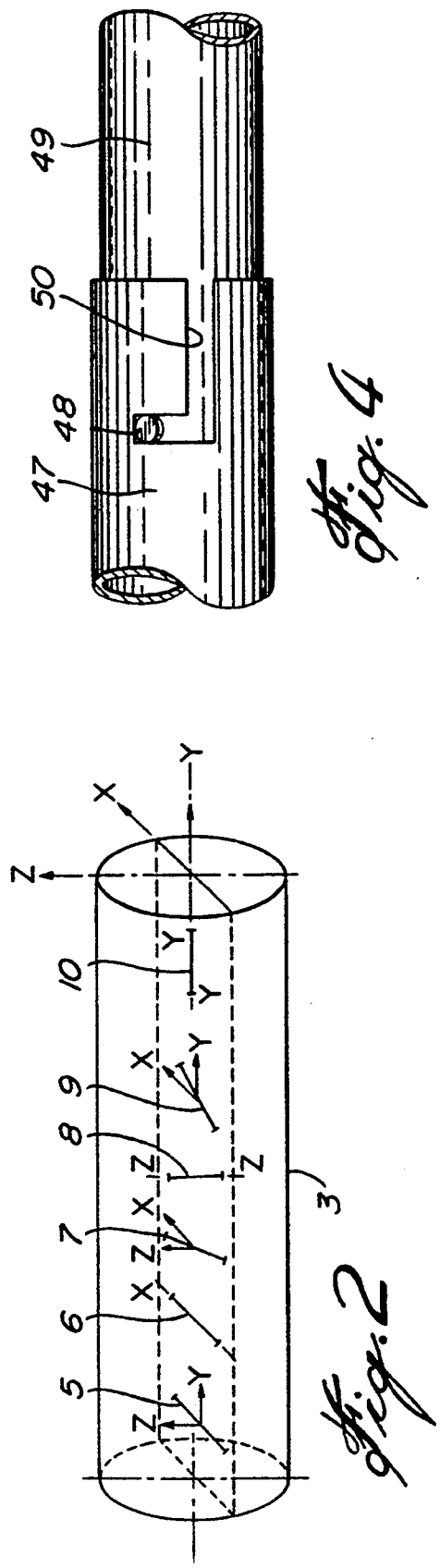

METHOD OF INSTRUMENTING AN ALREADY ERECTED CONCRETE STRUCTURE AND THE SO-INSTRUMENTED STRUCTURE

BACKGROUND OF THE INVENTION

1. Field of the Invention

The present invention relates to a method of instrumenting by means of a concrete inclusion an already erected structure made of material including concrete and/or rock in order to detect deformations of that structure. The invention also extends to the inclusion itself and to the so instrumented structure.

2. Brief Description of the Prior Art

In order to prevent dramatic ruptures of concrete works such as the dam of an hydroelectric complex, the pillars of a bridge or skyscraper, a concrete beam, etc. . . , these works are systematically scrutinized to detect any deformation thereof. For that purpose, strains gauges are conventionally embedded in these engineering structures during pouring of the concrete. Such strain gauges are capable of detecting deformations as small as one micrometer/meter ($10^{-6}$ m/m) in amplitude, and are positioned at critical points in the structures. As an example, U.S. Pat. No. 3,286,513 (WASIUTYNSKI) issued on Nov. 22, 1966, describes a probe to be embedded in concrete and comprising a set of strain gauges for simultaneously detecting six strain components at a selected spot in the concrete.

Before 1950, the engineering works were not so instrumented during pouring of the concrete. Also, it has been observed that a non negligible proportion of the embedded strain gauges become faulty after some years of service.

Accordingly, need has arisen for an efficient method of instrumenting already erected concrete structures.

Two prior art techniques have been developed to instrument such structures. The first one consists of a plastic cylinder on which strain gauges are adhered. This plastic cylinder is disposed in a hole of small diameter and any empty space between the cylinder and the concrete is sealed with epoxy. The second technique is concerned with steel inclusions placed in holes and subjected to the stresses occuring in the so instrumented structure. These two prior art techniques however present the disadvantage of being unsuitable for long-term monitoring for the following reasons:

the electric strain gauges adhered on the plastic cylinder are designed for short-term tests (some weeks); drift of the zero setting is very important after some months of service;

sealing with epoxy is unreliable in about 50% of the cases in bodies containing water;

the elastic properties of the involved materials change in time to make impossible the interpretation of the measurements; for example the steel corrodes and the plastic becomes fragile as it ages; and the composition of the inclusions is very different from that of the concrete of the structure, and accordingly the physico-chemical lifetime of the inclusions is likely to shorten.

OBJECTS OF THE INVENTION

An object of the present invention is therefore to eliminate the above discussed drawbacks of the prior art.

Another object of the invention is to provide a method of instrumenting an already erected structure using concrete and a grout readily available on the market at low cost, and which is simple and easily carried out on the site.

SUMMARY OF THE INVENTION

More specifically, the present invention is concerned with a method of instrumenting an already erected structure made of material including concrete and/or rock in order to determine the state of deformation of that structure. The method comprises the following steps:

fabricating an inclusion with concrete having substantially the same mechanical properties as the material of the structure, which fabricating step comprising embedding in the concrete of the inclusion sensor means capable of detecting deformations of the structure;

boring the structure to make a hole therein;

inserting and orienting the inclusion in the hole; and injecting a grout between the inclusion and the hole to tightly fill with this grout any empty space existing between these inclusion and hole.

Accordingly, any deformation of the structure also deforms the inclusion and is therefore detected by the sensor means.

The present invention also relates to an inclusion for instrumenting an already erected structure made of material including concrete and/or rock in order to detect deformations of that structure. The inclusion is formed of a body of concrete in which are embedded a plurality of sensors disposed in accordance with a three-dimensional arrangement to detect deformations of the already erected structure. The body is structured for insertion in a hole made into the structure.

Also in accordance with the invention, in an already erected structure made of material including concrete and/or rock, the improvement comprises:

a hole made in the structure;

an inclusion inserted in this hole, the inclusion being made of concrete having substantially the same mechanical properties as the material of the structure;

sensor means embedded in the concrete of the inclusion and capable of detecting deformations of the structure; and a grout tightly filling any empty space existing between the inclusion and the hole whereby any deformation of the structure also deforms the inclusion and is therefore detected by the sensor means.

The objects, advantages and other features of the present invention will become more apparent upon reading of the following non restrictive description of a preferred embodiment thereof, given with reference to the accompanying drawings.

BRIEF DESCRIPTION OF THE DRAWINGS

In the appended drawings:

FIG. 1 is a cross sectional view of a concrete structure being instrumented using the method in accordance with the present invention;

FIG. 2 is a schematic, perspective view of a concrete inclusion in which are embedded a plurality of vibrating wire gauges;

FIG. 4, which is disposed on the same sheet of formal drawings as FIGS. 1 and 2, is a partial view showing a tube section and a pole member used to introduce and orient the concrete inclusion in the hole of the concrete structure.

DETAILED DESCRIPTION OF THE PREFERRED EMBODIMENT

Figure 3A:
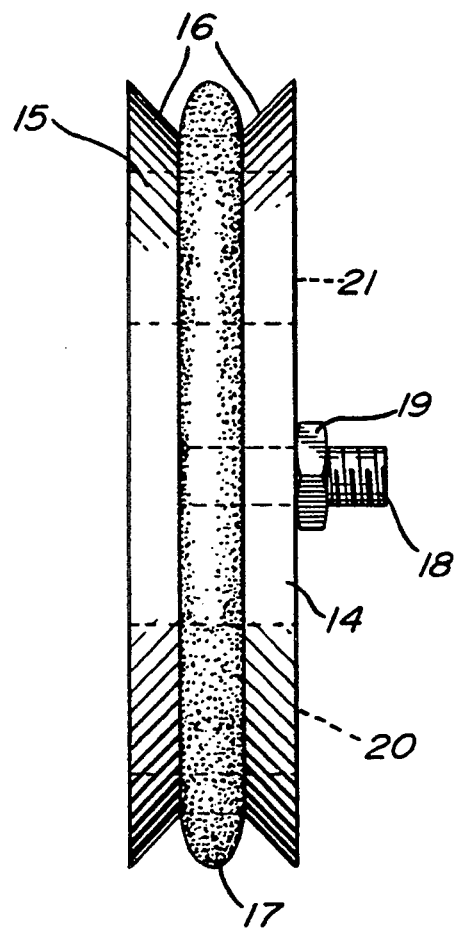
FIGS. 3a and 3b are respectively side and front elevation views of a stopper used to close the hole in the structure as the grout is injected.

Although the following description relates to the instrumentation of a concrete structure, it should be kept in mind that the present invention can also be applied to structures made of another material, such as rock pillar or embankment. For example, in metallic mines, the exploiter companies tend to reduce to the minimum the number of rock pillars and the workers can be endangered if such pillars are not closely scrutinized to detect any deformation thereof while excavation is progressing.

Referring now to FIG. 1 of the attached drawings, a structure 1, made of concrete, is being instrumented. As can be seen, only the portion of interest of the structure is shown in FIG. 1.

In a first step, an elongated, cylindrical hole 2 of given diameter has been drilled into the concrete of the structure 1.

An instrumented cell 45 is then inserted into the hole 2. The cell 45 consists of a cylindrical concrete body 42 enclosed in a cylindrical concrete shell 44. Both the body 42 and shell 44 are coaxial with the hole 2. A vibrating wire gauge 43 is embedded in the concrete of body 42. The shell 44 is sealed and the body 42 is not adhered or otherwise connected to the concrete of the latter shell. Spacers such as 46, typically made of plastic material, are adhered to the outer, cylindrical surface of the shell 44 to center the latter shell in the hole 2. Obviously, the outer diameter of the shell 44 is slightly smaller than the diameter of the hole 2.

The next step is to introduce in the hole 2 a cylindrical concrete inclusion 3 also of diameter slightly smaller than that of hole 2. For that purpose, a cylindrical steel tube section 47 has an end embedded in the concrete of the inclusion 3. As depicted in FIG. 4, the other free end of the tube section 47 has an end formed with a pair of diametrically opposed L-shaped slots such as 50. A cylindrical pole member 49 with a diameter slightly smaller than that of the tube section 47 is formed with a radial pin 48. In order to introduce the inclusion 3 in the hole 2, one slides the pole member 49 in the tube section 47 to insert the pin 48 into one of the slots 50, and then pushes the inclusion 3 through the pole member 49 and the tube section 47. The orientation of the inclusion 3 in the X-Z plane (FIG. 2) can be adjusted through rotation of the pole member 49 to thereby rotate the inclusion 3 through the tube section 47. Rotation of the inclusion 3 enables correct orientation of a plurality of vibrating wire gauges embedded therein as described hereinafter. As can be appreciated, using the pole member 49 and pipe section 47, one can insert deeply the inclusion 3 in the hole 2 of the structure 1. In order to center the inclusion 3 in the hole 2, spacers such as 4, typically made of plastic material, are adhered to the cylindrical surface of the inclusion 3.

When the inclusion 3 has been adequately positioned, the pole member 49 is removed from the tube section 47 and from the hole 2.

The inclusion 3, the body 42 and the shell 44 are made of concrete having substantially the same mechanical properties as the concrete of the structure 1. In this manner, the modulus of elasticity of the inclusion 3, body 42 and shell 44 is as close as possible to that of the structure 1 whereby any influence of a difference between these two moduli on the accuracy of the deformation measurements is eliminated.

In the example illustrated in FIG. 2, six vibrating wire gauges 5-10 are embedded in the inclusion upon pouring of the concrete. It should be noted here that the vibrating wire gage 43 (FIG. 1) is of the same type as the gauges 5-10. The technique of measuring deformations of a concrete body through measurement of the variation in length of vibrating wire gauges embedded in the concrete is well known to those skilled in the art, and it is therefore believed unnecessary to describe in the present specification that technique. As an example, U.S. Pat. No. 4,730,497 (RABENSTEINER et al.) issued on Mar. 15, 1988, proposes the use of a vibrating wire gauge in a deformation-measuring sensor to be embedded in concrete. FIG. 2 of the appended drawings shows the vibrating wire gauges 5-10 positioned in accordance with a three-dimensional arrangement. More particularly, vibrating wire gauges 6, 10 and 8 are respectively oriented in the direction of the axes X, Y and Z of a three-dimensional coordinate system. Vibrating gauge 5 is located in the plane defined by the axes Y and Z but at 45 degrees from these two axes, vibrating gauge 7 is located in the plane of the axes X and Z at 45 degrees from the two latter axes, while vibrating gauge 9 is in the plane of the axes X and Y and forms an angle of 45 degrees with these two axes. The complete tensor of deformations of the structure in any direction can therefore be determined by the set of vibrating gauges 5-10 to enable measurement thereof.

Also, as shown in FIG. 1, a longitudinal conduit 11 is partly embedded in the concrete inclusion 3.

In order to seal with grout any space existing between the inclusion 3, the shell 44 and the hole 2, the open end of the latter hole is closed by means of a stopper 13.

Figure 3B:
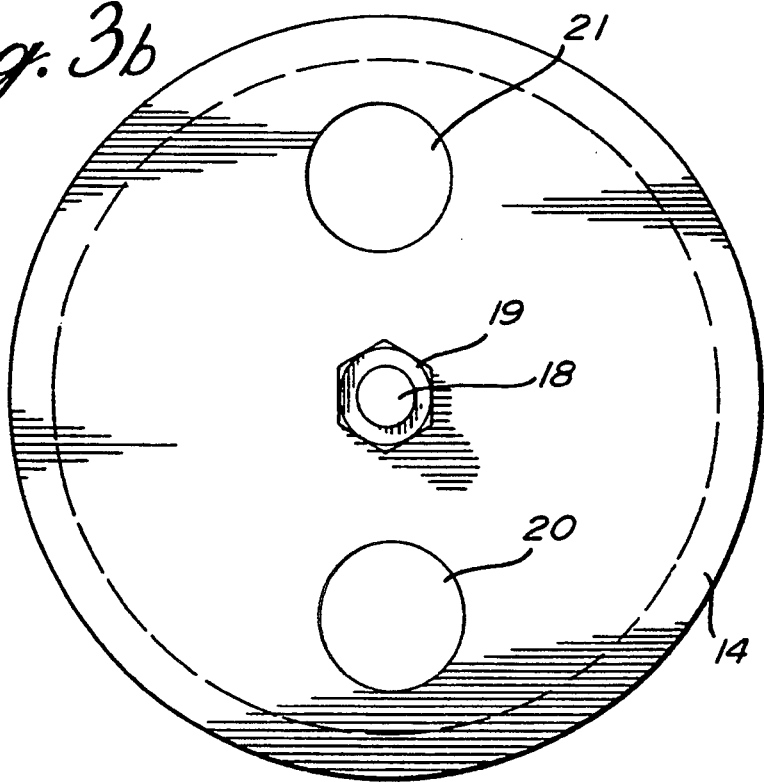

FIGS. 3a and 3b details the structure of the stopper 13, comprising a pair of outer and inner circular steel plates 14 and 15. These plates are peripherally beveled as shown at 16. A circular packer 17, advantageously made of rubber material, is disposed between the plates 14 and 15. A threaded rod 18 has one end welded to the center of the plate 15 and traverses holes made through the packer 17 and the plate 14. A nut 19 can be screwed to crush the rubber packer 17 between the plates 14 and 15. As can be appreciated by one skilled in the art, the periphery of the packer 17 is then forced against the wall of the cylindrical hole 2 to thereby tightly close the corresponding end of the latter hole. Two circular holes 20 and 21 are made through the plates 14 and 15 and the packer 17. An inlet pipe section 27 (FIG. 1) traverses the hole 20 and is aligned with and connected to the longitudinal conduit 11. The hole 20 is advantageously sealed with the pipe section 27 therein to prevent leakage of grout. An outlet pipe section 28 (FIG. 1) traverses the hole 21 and constitutes an outlet for the air and injected grout. Electric wires 26 (FIG. 1) of the vibrating gauges 5-10 and 43 embedded in the inclusion 3 and body 42 also pass into the hole 21. Again, the hole 21 is preferably sealed with the wires 26 therein to prevent leakage of grout through it.

Referring back to FIG. 1 of the attached drawings, a pump 29 sucks a grout 30 contained in a reservoir 31, and injects it into the hole 2 through the pipe section 27, and the longitudinal conduit 11 (see arrows 32, 33 and 34). Although FIG. 1 illustrates the pipe section 27 traversing the lower portion of the stopper 13, the latter pipe section can also traverse the upper portion of this stopper. It is however important to align the pipe section 27 with the conduit 11.

The grout injected through the pipe section 27 and the conduit 11 fills the space between the shell 44 and hole 2 (see arrows 51, 52 and 53) and returns through the cylindrical space 35 defined between the hole 2 and the inclusion 3 (see arrows 36, 37 and 54), and is directed toward the outlet pipe section 28 (see arrows 38, 39, 40 and 41), to thereby tightly fill any empty space between the stopper 13 and the opposite, closed end of the hole 2.

The deformations of the structure and the associated variations in the distribution of the stresses are calculated using the measurements obtained through the vibrating wire gauges in the instrumented inclusion taking into consideration the homogeneity and the elasticity of the structure. Accordingly, the injected grout should present elastic properties (modulus of elasticity and Poisson's ratio) as close as possible to those of the environment (the concrete of both the inclusion and structure). In the preparation of the grout, one must therefore take into account the type of the cement and the ratio of water/cement. Any change in this ratio (water/cement) modifies the composition of the grout and consequently its mechanical and hydraulic behaviour.

The type of cement used is determined by the environmental conditions in the concrete structure such as the temperature, humidity, chemistry of the underground water, etc. . . , as they influence the short- and long-term behaviour of the grout, in particular its durability. To make easier the on-site installation of the inclusion, Portland cement of type 10 or type 30 is used.

As well known in the art, additives or expansive agents such as aluminum powder can be added to modify other properties of the grout such as its viscosity, its porosity, its adherence and its mechanical resistance (tension, compression, flexion and shear).

One can appreciate that the concrete structure 1, the inclusion 3 and the grout 30 form an homogeneous mass whereby any deformation of the structure 1 is transmitted through the grout to deform the inclusion 3 and is therefore detected by the vibrating gauges 5–10.

The measurements from the vibrating gauge 43 enable control of the influence of the variations of the environmental conditions. More specifically, they enable compensation of the deformation measurements for any change in the environmental conditions, such as temperature, humidity, aging of the concrete, etc., that is any environmental condition not related to deformation of the concrete caused by change of stresses in the structure.

The technique in accordance with the invention presents, for the intended applications, numerous advantages including in particular the following ones:

as the cylindrical inclusion may have a diameter of 14 cm and a length of 50 cm, its volume is well larger than that of the bigger granules whereby the measurements are representative of the real deformations contrary to certain prior art devices whose volume is too small;

as the inclusion and the structure to be instrumented are made of concrete having a similar composition and the hole in the structure is sealed with a grout, there is no deterioration over a time period as long as 50 years;

the vibrating wire gauges are very accurate but are simpler to implement than the high performance, electric strain gauges used in steel structures. Also, some vibrating gauges are installed since over 40 years. The vibrating gauges are so positioned that the measurements are all related to the same critical spot whereby the instrumented portion of the concrete inclusion can be as short as 10 cm; and an instrumented cell is provided for enabling necessary correction of the deformation values due to variations in the environmental conditions.

Although the present invention has been described hereinabove with reference to preferred embodiments thereof, such embodiments can be modified at will, within the scope of the appended claims, without departing from the nature and spirit of the subject invention.

The embodiments of the invention in which an exclusive property or privilege is claimed are defined as follows:

1. A method of instrumenting an already erected structure made of material including concrete and/or rock in order to determine the state of deformation of the said structure, comprising the steps of:
   fabricating an inclusion with concrete having substantially the same mechanical properties as the material of the said structure, said fabricating step comprising embedding in the concrete of the inclusion sensor means capable of detecting deformations of the said structure;
   boring the structure to make a hole therein;
   inserting and orienting the inclusion in said hole; and
   injecting a grout between the said inclusion and the said hole to tightly fill with said grout any empty space existing between the said inclusion and hole;
   whereby any deformation of the structure also deforms the inclusion and is therefore detected by the sensor means.

2. A method of instrumenting an already erected structure as recited in claim 1, in which the said structure is made of concrete, and the concrete of the inclusion has substantially the same mechanical properties as the concrete of the structure.

3. A method of instrumenting an already erected structure as recited in claim 1, wherein said hole and inclusion are cylindrical, and wherein the hole has a diameter slightly greater than the diameter of the inclusion, said method further comprising the step of centering said inclusion in the hole before the injection of the said grout.

4. A method of instrumenting an already erected structure as recited in claim 1, in which:
   the hole and inclusion are elongated;
   the step of fabricating an inclusion comprises providing said inclusion with a longitudinal conduit;
   the said method further comprises, before the step of injecting a grout, tightly closing an end of the elongated hole with a stopper, a grout inlet pipe section traversing the said stopper and being aligned with the said longitudinal conduit; and
   the step of injecting a grout comprises injecting the said grout though the inlet pipe section and the longitudinal conduit.

5. A method of instrumenting an already erected structure as recited in claim 4, in which:
   the stopper also comprises a grout outlet;
   the hole and inclusion are structured to define an empty space between the said hole and inclusion;
   said hole has a second, closed end; and
   said step of injecting a grout comprises returning the grout injected through the inlet pipe section and the longitudinal conduit through the said empty space toward the grout outlet of the said stopper.

6. A method of instrumenting an already erected structure as recited in claim 1, wherein said step of fabricating an inclusion comprises embedding in the concrete of the said inclusion a plurality of vibrating wire gauges disposed in accordance with a three-dimensional arrangement, the vibrating gauges constituting the said sensor means capable of detecting deformations of the stucture.

7. A method of instrumenting an already erected structure as recited in claim 6, in which said steps of inserting and orienting the inclusion in said hole comprises orienting the said vibrating wire gauges in respective, predetermined directions.

8. A method of instrumenting an already erected structure as recited in claim 1, in which said step of injecting a grout comprises pumping the said grout from a reservoir.

9. A method of instrumenting an already erected structure as recited in claim 1, further comprising the step of inserting an instrumented concrete cell in the hole of said structure;

whereby measurements from the instrumented cell can be used to compensate measurements from the said sensor means for change in the environmental conditions in the structure.

10. A method of instrumenting an already erected structure as recited in claim 9, in which a vibrating wire gauge is embedded within the concrete of the said cell.

11. A method of instrumenting an already erected structure as recited in claim 1, wherein said grout has mechanical properties close to those of said concrete of the inclusion and said material of the structure.

12. In an already erected structure made of material including concrete and/or rock, the improvement comprising:

said structure having a hole therein;

an inclusion inserted in said hole, the inclusion being made of concrete having substantially the same mechanical properties as the material of the structure;

sensor means embedded in the concrete of the inclusion and capable of detecting deformations of the said structure; and a grout tightly filling any empty space existing between the said inclusion and hole whereby any deformation of the structure also deforms the inclusion and is therefore detected by the sensor means.

13. An already erected structure according to claim 12, wherein said structure is made of concrete, and wherein the concrete of the inclusion has substantially the same mechanical properties as the concrete of the structure.

14. An already erected structure according to claim 12, further comprising an instrumented cell inserted in said hole, said cell comprising (a) a concrete shell, any empty space existing between said shell and said hole being filled with said grout, and (b) an instrumented concrete body disposed in the concrete shell but not connected to the said shell.

15. An already erected structure according to claim 14, in which a vibrating wire gauge is embedded in the concrete of the said body.

16. An already erected structure according to claim 14, wherein said concrete body, said concrete shell and said hole in the inclusion, are cylindrical and coaxial.

17. An already erected structure according to claim 12, wherein said grout has mechanical properties close to those of said concrete of the inclusion and said material of the structure.

* * * * *